April 26, 1949. P. TURNER 2,468,313
MOUNTING MEANS FOR PUSH-TYPE MOWERS
Filed May 13, 1947 3 Sheets-Sheet 2
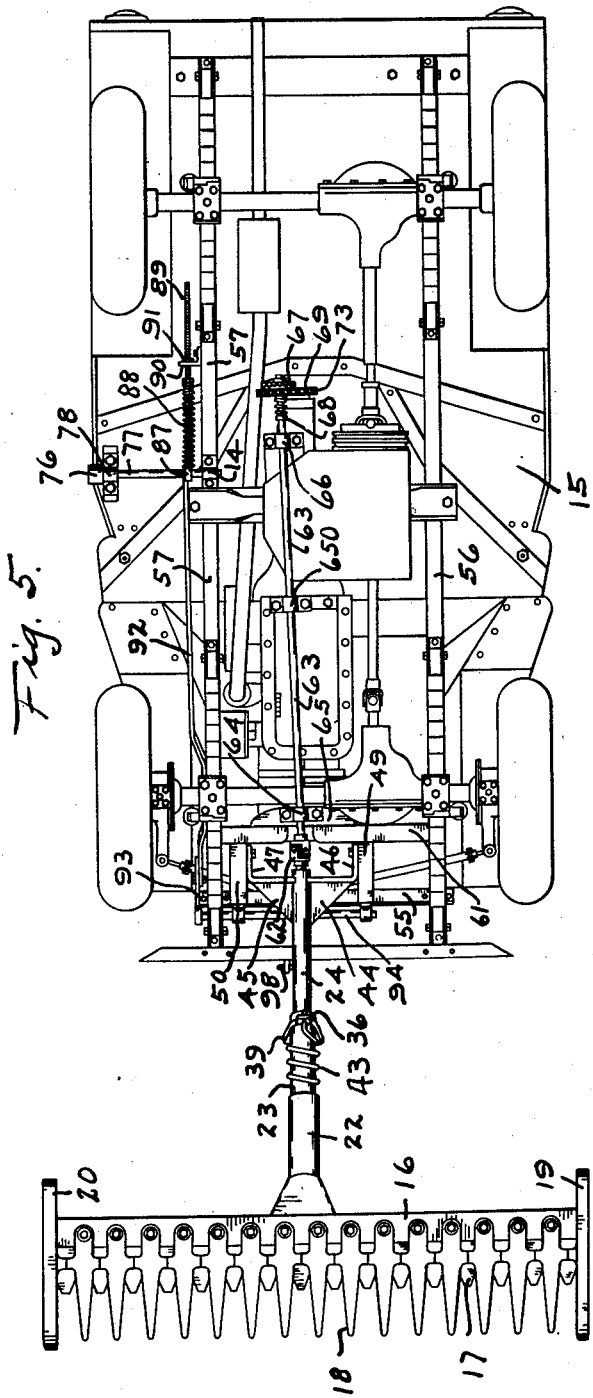
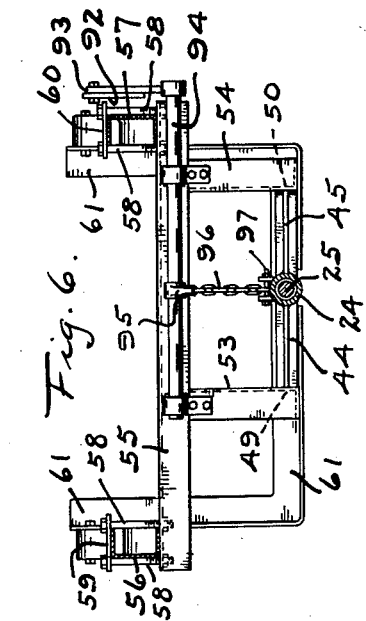
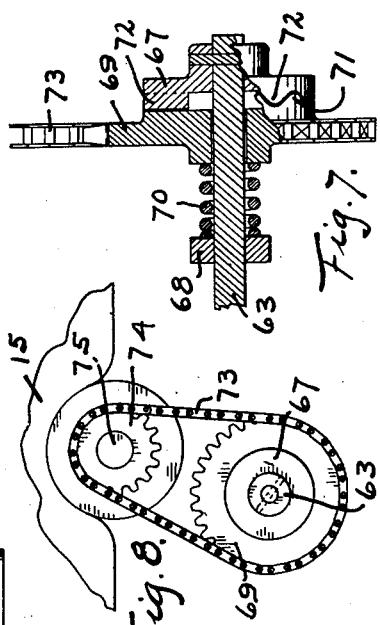
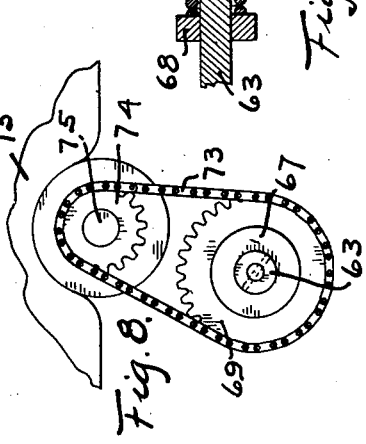
INVENTOR,
PETER TURNER,
By Herbert A. Minturn
ATTORNEY.

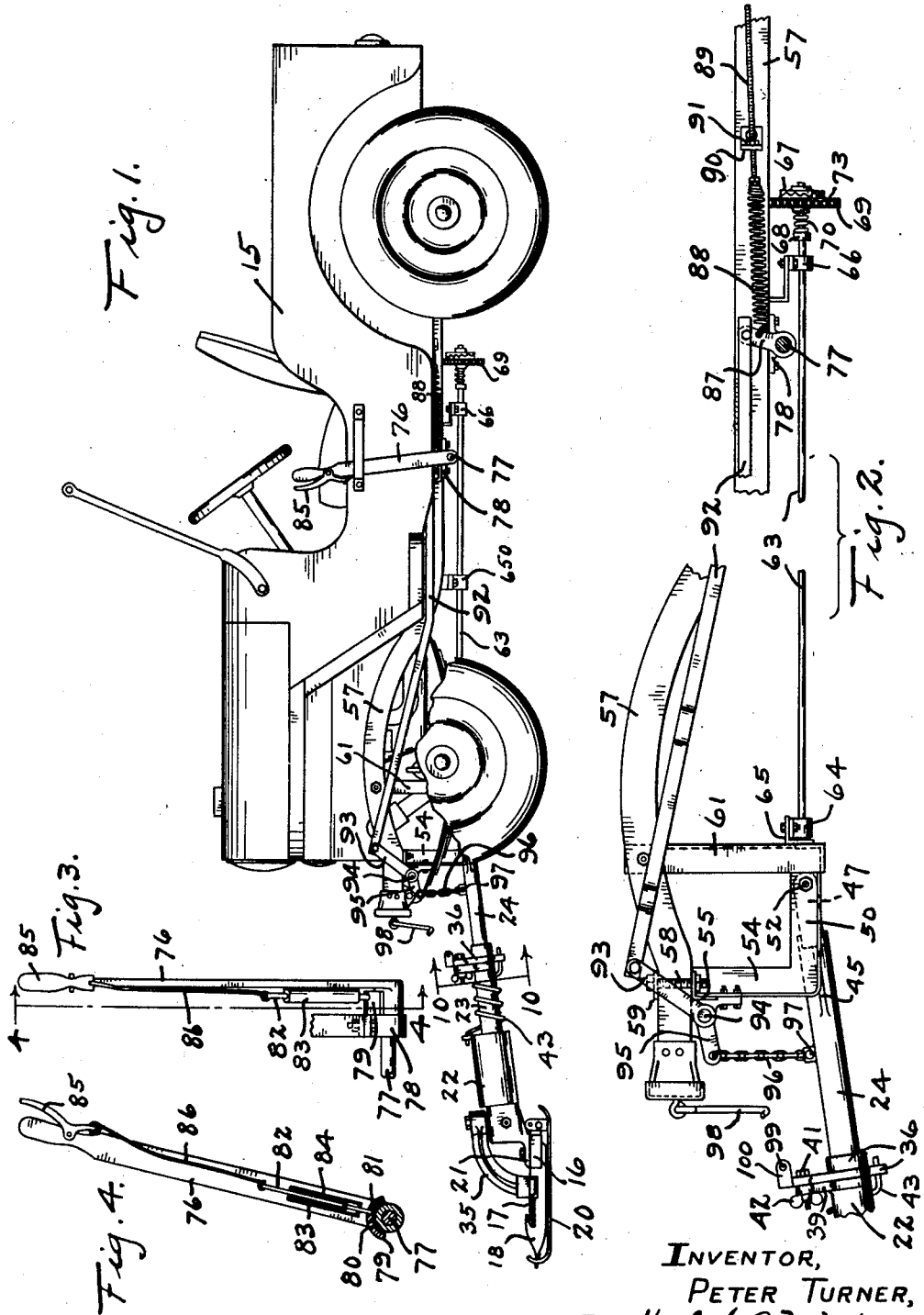

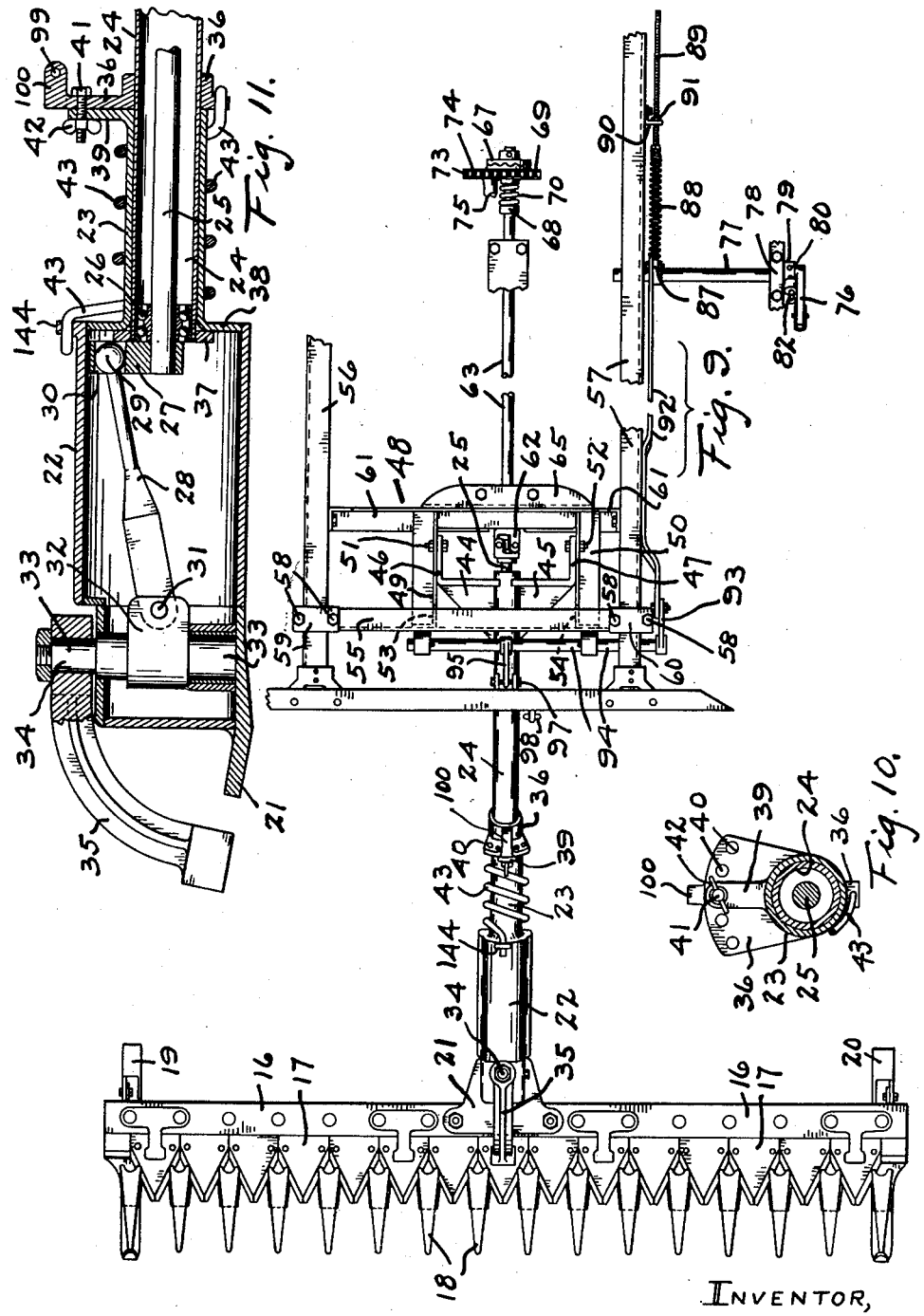

Patented Apr. 26, 1949

2,468,313

UNITED STATES PATENT OFFICE 2,468,313

MOUNTING MEANS FOR PUSH-TYPE MOWERS

Peter Turner, Indianapolis, Ind.

Application May 13, 1947, Serial No. 747,692

17 Claims. (Cl. 56—25)

This invention relates to means for operating and maintaining a pusher type mower on a vehicle.

The invention comprises the use of that type of mower having its cutter bar mounted intermediate its ends so that the bar may rock to follow the contour of the ground in the manner indicated in the U. S. Letters Patent to Earl K. Miles, No. 1,849,682, issued March 15, 1932.

A primary object of the invention is to provide a mounting whereby the mower may be quickly attached and detached to a wide range of driving vehicles, in each instance in a manner whereby the cutter bar is pushed forwardly of the vehicle and may be lifted and lowered by a control lever conveniently mounted within reach of the operator.

A further important object of the invention is to provide means whereby the cutter bar may be lifted from the ground, both ends substantially at the same time, or at least in such manner that when the bar is lifted, it will assume a substantially horizontal position when clear of the ground.

These and many other objects and advantages of the invention will become apparent to those skilled in the art in the following description of one particular form of the invention as illustrated by the accompanying drawings, in which Fig. 1 is a fragmentary view in side elevation of a vehicle on which the mower is mounted;

Fig. 2, a detail on an enlarged scale in side elevation of the mower mounting frame and drive;

Fig. 3, a view in front elevation of the lifting control lever;

Fig. 4, a vertical section on the line 4—4 in Fig. 3;

Fig. 5, a bottom plan view of the vehicle and mounted mower;

Fig. 6, a detail in front elevation of the mower mounting frame;

Fig. 7, a detail in partial vertical section through the driven end of the mower drive shaft;

Fig. 8, a view in rear elevation of the drive from the vehicle power take-off shaft to the mower driving shaft;

Fig. 9, a view in top plan of the mower and its mounting and driving connections with the vehicle;

Fig. 10, a detail on an enlarged scale in section on the line 10—10 in Fig. 1; and Fig. 11, a detail on an enlarged scale in vertical section through the mower driving head.

Referring to the drawings, in which like characters of reference indicate like parts in the several views, a vehicle generally designated by the numeral 15 is illustrated as being one type of vehicle to which the invention may be applied. While the invention is not limited to this type of vehicle and the invention may be applied to the so-called farm type of tractors the illustrated type of vehicle serves exceptionally well. It is of the four-wheel type with a power take-off drive available from either the rear end or the underside, herein shown as from the underside.

The mower with which the invention is involved, comprises the usual bar 16, longitudinally of which there is carried the reciprocating sickle 17 with the usual guards 18 extending forwardly thereof. The ends of the bar 16 carry any suitable type of bar supports for riding on the ground over which the mower is to operate. In the form herein shown, these supports consist of adjustable shoes 19 and 20. The bar 16 is fixed intermediate its ends, preferably centrally thereof to a foot 21 which extends forwardly from the underside of a swivel head 22. This head 22, Fig. 11, is generally cylindrical in shape and carries at its rear end a tube 23 which telescopes over the tubular shaft 24 with a sliding fit. The head 22 may thus revolve about the axis of the shaft 24, their two geometric axes being coincident or in common.

A drive shaft 25 extends axially through the shaft 24 through a bearing 26 at the forward end thereof to carry a crank arm 27. A connecting arm 28 has a ball head 29 fitted within a bore 30 through an outer portion of the crank 27. The other end of the connecting arm 28 is hinged by the pin 31 between the rearwardly extending arms of a yoke 32 in turn fixed to a vertical shaft 33. The shaft 33 extends outwardly through the head 22 by a length 34, on which is fixed a lever 35 that extends forwardly and downwardly to interconnect with the sickle 17 in any suitable manner. All of this drive from the shaft 25 to the sickle 17 follows closely the structure shown in the U. S. patent to George J. Parham, No. 391,069, issued October 16, 1888, and therefore the drive is not further illustrated nor described in detail since it does not constitute the gist of the invention but is only indicated as one particular means of operating the sickle 17 in conjunction with the tubular shaft 24.

The bracket 36 is fixed around the outside of the shaft 24 at a distance from the forward end thereof and serves as a rear abutment for the tube 23. The tube 23 is maintained in sliding contact by its end with that bracket 36 by any suitable means, herein shown as by a nut 37 engaged with the forward end of the shaft 24 within the housing 22 and abutting the rear wall 38 of that housing from which the tube 23 extends. The structure so far described in reference to the mounting of the bar 16 to be pushed and carried by the tubular shaft 24 provides that the bar 16 may rock laterally of the shaft 24 by reason of the turning of the tube 23 around that shaft. In some instances, it may be desirable to prevent that rocking and hold the bar 16 in a fixed angular position in reference to the axis of the shaft 24. To permit that, an arm 39 is fixed to the tube 23 to rock around the forward face of the bracket 36. The bracket 36 is provided with a plurality of holes 40 therethrough and the bolt 41 may be selectively inserted through any one of these holes 40 and through a hole in the arm 39 and secured by means of a wing nut 42.

Normally, however, the bar 16 is allowed to rock about the end of the tubular shaft 24 in order to follow the contour of the ground and give a better cutting action, particularly where it is desirable to have an even and smooth cutting such as of lawns and the like. A torsion spring 43 is wrapped loosely around the tube 23 to have one end thereof engaged with either the tube 23 or the head 22 herein shown as with the head 22, and by its other end to some fixed position in reference to the tubular shaft 24. As indicated in Fig. 11, this other end is engaged by an underside portion of the bracket 36. The forward end of the spring 43 passes through an ear 144 provided on the housing 22. The spring 43 is normally mounted to have the bar 16 in a substantially horizontally disposed position when the shaft 24 is elevated to hold the bar 16 clear of the ground. Hence, turning the bar 16 downwardly by one end will tend to wind up the spring 43, and the other end of the bar downwardly will tend to unwind the spring, both operations being resisted by means of the action of that spring.

The shaft 24 is of such length to locate the bar 16 ahead of the vehicle 15 a distance permitting the operator, when riding in the vehicle, to observe the bar and its sickle during the cutting operation. The rear end of the tubular shaft 24 has a yoke formed thereon by the two arms 44 and 45 extending respectively from each side thereof and turning rearwardly in spaced apart relation by parallel legs 46 and 47.

The mounting frame, Fig. 9, generally designated by the numeral 48, is built up to provide generally horizontally disposed side members 49 and 50 to which the legs 46 and 47 are respectively hinged by any suitable means such as by the bolts 51 and 52. In the form herein shown, these members 49 and 50 are upturned at their forward ends into the legs 53 and 54. The upper portions of these legs 53 and 54 are secured to a transverse bar 55 which has its ends respectively secured to the side rails 56 and 57 of the frame of the vehicle 15. For the vehicle 15 this bar 55 fits best under the rails 56 and 57, Fig. 2, and bolts 58 extend through the member 55 on both the insides and outsides of the two rails through top side clamp plates 59 and 60 in order to not only support the bar 55 vertically but also to hold it against horizontal shifting along those rails 56 and 57.

Further, the rear ends of the members 49 and 50 are fixed to a generally U-shaped member 61, the upper ends of those legs being secured to the side rails 56 and 57. Thus the side members 49 and 50 secured rigidly in position in respect to the vehicle frame rails 56 and 57 serve to rockably support the shaft 24 and as means to push that shaft forwardly as the vehicle may travel. The drive shaft 25 extends rearwardly from the shaft 24 to have a universal joint 62 fixed thereon. A jack shaft 63 has its forward end fixed to the universal joint 62 whereby this shaft 63 may turn the shaft 25 through the universal joint 62 at various vertical angles within the range of the rocking of the shaft 24. The shaft 63 has its forward portion just back of the universal joint 62 supporting by a bearing 64 that is mounted on the underside of a plate 65 extending from the transverse portion of the member 61. The shaft 63 extends rearwardly under the vehicle 15 through an intermediate bearing 650 and then through a rear bearing 66 to have fixed on its rear end a drive head 67 forming a part of a slip clutch. A collar 68 is fixed to the shaft 63 forwardly of the member 61. A sprocket 69 is revolubly mounted on the shaft 63 and between it and the collar 68 is a compression spring 70 normally urging the sprocket toward the head 67. The rear face of the sprocket 69 and the forward face of the head 67 are provided with a plurality of intermeshing rounded teeth 71 and 72 respectively. Should the sickle bar 17 become locked for any reason, the driving sprocket 69 may continue to turn by reason of the teeth 71 over-riding the teeth 72, that compression spring 70 otherwise holding those teeth in engagement. A drive chain 73 engages around the driving sprocket 74 that is mounted on the power take-off shaft 75, Fig. 8, of the vehicle 15.

Thus by the usual control system provided in vehicles of this kind, the shaft 75 may be operated at will to drive the sickle 17. The control is not complete however, without some means for lifting the bar 16 sufficiently high above the ground to permit the vehicle 15 to travel when the mower is not to be operated. For this purpose, a lifting lever 76 is mounted in any suitable location herein shown as on the outside of the left-hand side of the vehicle 15, Fig. 1, to be movable in fore and aft directions. The lower end of the lever 76 is fixed to a shaft 77 that is carried through bearings 78 and 14, Fig. 5, mounted on the underside of the vehicle 15. At the bearing 78, Figs. 3 and 4, there is a fixed sector 79 carried by that bearing and having at least two holes 80 and 81 therein. A plunger 82 is carried through a cylinder 83 to have its lower end normally urged downwardly by a compression spring 84 in the cylinder 83 whereby the lower end of that plunger 82 upon riding over the surface of the sector 79 will drop into either one of the holes 80 or 81 as the travel may be. These holes 80 and 81 are spaced apart and so located that when the plunger 82 is in the hole 81, the forward end of the shaft 24 is dropped and free to ride on the ground through the shoes 19 and 20, and when the plunger 82 is in the hole 80, the shaft 24 is lifted to have the mower in the carrying position spaced above the ground. The usual finger latch member 85 is provided at the upper end of the lever with the intermediate rod 86 between that latch member 85 and the plunger 82 as means for lifting the plunger against the urge of the spring 84.

In order to accomplish the operation of lifting the forward end of the shaft 24, a lever 87, Fig. 2, is fixed to the lever rock shaft 77 to turn upwardly therefrom adjacent the frame rail 57. A spring 88 has its forward end connected to the lever 87 and its rear end to a threaded rod 89 which slides through a bracket 90 fixed to the side of the rail 57 and adjustably fixed in relation to the bracket 90 by means of a nut 91 on the rear side of the bracket so that the nut 91 is employed as a means for stretching or releasing spring 88 to secure the desired pull on the lever 87.

From the upper end of the lever 87 extends a connecting bar 92 forwardly and generally along the outside of the rail 57 to rockably engage by its forward end with the upper end of a lever 93 which is secured to a transverse shaft 94 revolubly mounted across the front sides of the members 53 and 54 adjacent the cross member 55. This cross shaft 94 extends transversely across and is spaced well above the forwardly extending shaft 24. Directly above the shaft 24 there is a lever 95 fixed by one end to the cross shaft 94 and carrying by its outer free end a chain 96 which drops downwardly to be connected to the shaft 24 by any suitable means such as by the pin 97, Figs. 2 and 9. Since there are several links at least provided in the length of this chain 96, the shaft 24 is free to rock downwardly to the full length of that chain with the shaft 94 held in a fixed position providing there is sufficient clearance under the shoes 19 and 20 and the bar 16. During the cutting operation, the shoes 19 and 20 are allowed to slide over the ground with slack in the chain 96 so that the shaft 24 is free to travel upwardly and downwardly to permit those shoes 19 and 20 to ride on the ground but to prevent them from dropping into holes causing the guards 18 to dig into the banks of those holes upon continued forward travel of the vehicle. The length of the chain 96 is made to be such that when the lever 76 is pulled rearwardly to have the plunger 82 drop into the hole 80, the mower bar 16 is lifted for the travelling position. Then when the lever 76 is pushed to the forward position to have the plunger 82 in the hole 81, the lever 95 rocks downwardly a sufficient distance to bring the shoes 19 and 20 onto the ground and allow some slack in the chain 96 as above indicated.

Now, as above discussed, unless some means is provided to prevent it, when the shaft 24 is rocked upwardly, one end of the cutting head including the bar 16 and the sickle 17, would invariably tend to drop and drag on the ground because it is practically impossible to so balance those members in reference to the axis of the shaft 24 to prevent it, particularly when some grass may hang on one end of the bar. Therefore in rocking the shaft 24 upwardly, the means as herein shown and described consist of the torsion spring 43 connected as above indicated very effectively prevents that tendency for one end of the bar to drop relatively, and yet does not interfere with the bar following the contour of the ground since the shoe 19 or 20, whichever may be the case, riding on the higher ground will be lifted against the resistance of the spring 43 to lower the other shoe and maintain it in contact with the ground on the other side. Thus when the lever 76 is pulled rearwardly the bar 16 will lift substantially horizontally. When the vehicle 15 is to be driven over considerable long distances between the fields of cutting operations and it is desired to take the load of the mower off of the lifting means, the lever 76 may be pulled rearwardly to carry the plunger 82 past the hole 80 a sufficient distance to bring the shaft 24 high enough to permit a hook 98 secured to the vehicle 15 to engage in the eye 99 provided in the ear 100 extending from the top end of the bracket 36 whereupon the load will then be transferred to the hook 98 when the lever 76 is released.

In the claims, the term "support means" includes the mechanism for supporting the sickle and sickle bar in such manner that these and other parts, including the frame, may be pivotally attached to a vehicle.

Therefore, while I have herein shown and described my invention in the one particular form as now best known to me, it will be obvious to those working in the art that structural changes may be employed without departing from the spirit of the invention and I therefore do not desire to be limited to that precise form beyond the limitations which may be imposed by the following claims.

I claim:

1. For a vehicle having a power take-off drive, mounting means attachable to a forward portion of the vehicle and providing horizontally spaced apart bearing members; a shaft; means hingedly connecting a rear portion of the shaft to said bearing members to permit the shaft to rock vertically therefrom; a head mounted on the other end of said shaft normally free to revolve circumferentially of the shaft; a mower sickle bar mounted on said head intermediate the bar ends to rock with the head; a sickle reciprocatingly carried by said bar; sickle reciprocating means carried by said head; drive means for operating said reciprocating means extending longitudinally of said shaft to said shaft mounting means; a drive connecting with said drive means and connectable with said power take-off drive; a lever; means for rockably mounting the lever on said vehicle; a link connection between said lever and said shaft; and means for rocking the lever to lift and lower said shaft through said link connection; an abutment on said shaft; yielding means, said yielding means comprising a spring connecting by one end with said head and by the other end with said abutment.

2. For a vehicle having a power take-off drive; mounting means attachable to a forward portion of the vehicle and providing horizontally spaced apart bearing members; a shaft; means hingedly connecting a rear portion of the shaft to said bearing members to permit the shaft to rock vertically therefrom; a head mounted on the other end of said shaft normally free to revolve circumferentially of the shaft; a mower sickle bar mounted on said head intermediate the bar ends to rock with the head; a sickle reciprocatingly carried by said head; drive means for operating said reciprocating means extending longitudinally of said shaft to said shaft mounting means; a drive connecting with said drive means and connectable with said power take-off drive; a lever; means for rockably mounting the lever on said vehicle; a link connection between said lever and said shaft; and means for rocking the lever to lift and lower said shaft through said link connection; said head having a tubular portion telescoping with said shaft; an abutment fixed to the shaft against which said portion abuts; and a spring encircling said portion and having one end held by said head and the other end by said abutment to yieldingly restrain said circumferential rocking of the head.

3. For a vehicle having a power take-off drive;

mounting means attachable to a forward portion of the vehicle and providing horizontally spaced apart bearing members; a shaft; means hingedly connecting a rear portion of the shaft to said bearing members to permit the shaft to rock vertically therefrom; a head mounted on the other end of said shaft normally free to revolve circumferentially of the shaft; a mower sickle bar mounted on said head intermediate the bar ends to rock with the head; a sickle reciprocatingly carried by said bar; sickle reciprocating means carried by said head; drive means for operating said reciprocating means extending longitudinally of said shaft to said shaft mounting means; a drive connecting with said drive means and connectable with said power take-off drive; a lever; means for rockably mounting the lever on said vehicle; a link connection between said lever and said lever shaft; and means for rocking the lever to lift and lower said shaft through said link connection; said head having a tubular portion telescoping with said shaft; an abutment fixed to the shaft against which said portion abuts; and a spring encircling said portion and having one end held by said head and the other end by said abutment to yieldingly restrain said circumferential rocking of the head; a member extending radially from said shaft; an arm rockable with said head across said radial member; and means interengaging said arm with said radial member at selected positions therearound.

4. For a vehicle having a power take-off drive, mounting means attachable to a forward portion of the vehicle and providing horizontally spaced apart bearing members; a shaft; means hingedly connecting a rear portion of the shaft to said bearing members to permit the shaft to rock vertically therefrom; a head mounted on the other end of said shaft normally free to revolve circumferentially of the shaft; a mower sickle bar mounted on said head intermediate the bar ends to rock with the head; a sickle reciprocatingly carried by said bar; sickle reciprocating means carried by said head; drive means for operating said reciprocating means extending longitudinally of said shaft to said shaft mounting means; a drive connecting with said drive means and connectable with said power take-off drive; a lever; means for rockably mounting the lever on said vehicle; a link connection between said lever and said shaft; and means for rocking the lever to lift and lower said shaft through said link connection; a bracket fixed to said shaft adjacent said head; an arm carried by said head to swing across said bracket with revolution of the head; and means for securing said arm to said bracket at selected positions of head rocking.

5. A push-type mower comprising support means, said support means having a pivotal connection adapted for mounting on a motor vehicle, a sickle and a sickle bar, said support means including at least two parts relatively rotatable with relation to each other about a common axis, one of said parts being operatively connected to said sickle bar, driving means operatively connected with said sickle and supported at least partially by said support means, a universal connection in said driving means, said driving means being adapted for connection with a source of power.

6. A push-type mower comprising support means, said support means having a pivotal connection adapted for mounting on a motor vehicle, a sickle and a sickle bar, said support means including at least two parts relatively rotatable with relation to each other about a common axis, one of said parts being operatively connected to said sickle bar, driving means operatively connected with said sickle and supported at least partially by said support means, a universal connection in said driving means in substantial alignment with the axis of said pivotal connection, said driving means being adapted for connection with a source of power.

7. A push-type mower comprising support means, said support means having a pivotal connection adapted for mounting on a motor vehicle, a sickle and a sickle bar, said support means including at least two parts relatively rotatable with relation to each other about a common axis, one of said parts being operatively connected to said sickle bar, driving means operatively connected with said sickle and supported at least partially by said support means, a universal connection in said driving means in substantial alignment with the axis of said pivotal connection, said driving means being adapted for connection with a source of power and including a crank mechanism connected to said sickle.

8. A push-type mower comprising support means, said support means having a pivotal connection adapted for mounting on a motor vehicle, a sickle and a sickle bar, said support means including at least two parts relatively rotatable with relation to each other about a common axis, one of said parts being operatively connected to said sickle bar, driving means operatively connected with said sickle and supported at least partially by said support means, a universal connection in said driving means in substantial alignment with the axis of said pivotal connection, said driving means being adapted for connection with a source of power and including a crank mechanism connected to said sickle, a thrust link and a thrust block.

9. A push-type mower comprising support means, said support means having a pivotal connection adapted for mounting on a motor vehicle, a sickle and a sickle bar, said support means including at least two parts relatively rotatable with relation to each other about a common axis, one of said parts being operatively connected to said sickle bar, driving means operatively connected with said sickle and supported at least partially by said support means, a universal connection in said driving means in substantial alignment with the axis of said pivotal connection, said driving means being adapted for connection with a source of power, said relatively rotatable parts including a part rigidly connected to the sickle bar and a second part mounted in sleeved relationship with said first-named part.

10. A push-type mower comprising support means, said support means having a pivotal connection adapted for mounting on a motor vehicle, a sickle and a sickle bar, said support means including at least two parts relatively rotatable with relation to each other about a common axis, one of said parts being operatively connected to said sickle bar, driving means operatively connected with said sickle and supported at least partially by said support means, a universal connection in said driving means in substantial alignment with the axis of said pivotal connection, said driving means being adapted for connection with a source of power, said relatively rotatable parts including a part rigidly connected to the sickle bar and a second part mounted in sleeved relationship with said first-named part, and spring means having its ends connected to said parts.

11. A push-type mower comprising support means, said support means having a pivotal connection adapted for mounting on a motor vehicle, a sickle and a sickle bar, said support means including at least two parts relatively rotatable with relation to each other about a common axis, one of said parts being operatively connected to said sickle bar, driving means operatively connected with said sickle and supported at least partially by said support means, a universal connection in said driving means in substantial alignment with the axis of said pivotal connection, said driving means being adapted for connection with a source of power, said relatively rotatable parts including a part rigidly connected to the sickle bar and a second part mounted in sleeved relationship with said first-named part, and means for adjustably regulating the rotatable position of one part with regard to the other member.

12. A push-type mower comprising support means, said support means having a pivotal connection adapted for mounting on a motor vehicle, a sickle and a sickle bar, said support means including at least two parts relatively rotatable with relation to each other about a common axis, one of said parts being operatively connected to said sickle bar, driving means operatively connected with said sickle and supported at least partially by said support means, a universal connection in said driving means in substantial alignment with the axis of said pivotal connection, said driving means being adapted for connection with a source of power, said relatively rotatable parts including a part rigidly connected to the sickle bar and a second part mounted in sleeved relationship with said first-named part, spring means having its ends connected to said parts, and means for adjustably regulating the rotatable position of one part with regard to the second part.

13. A push-type mower comprising support means, said support means having a pivotal connection adapted for mounting on a motor vehicle, a sickle and a sickle bar, said support means including at least two parts relatively rotatable with relation to each other about a common axis, one of said parts being operatively connected to said sickle bar, driving means operatively connected with said sickle and supported at least partially by said support means, a universal connection in said driving means in substantial alignment with the axis of said pivotal connection, and means for drivingly connecting said driving means with a source of power from said motor vehicle and at a point beneath said motor vehicle.

14. A push-type mower comprising support means, said support means having a pivotal connection adapted for mounting on a motor vehicle, a sickle and a sickle bar, said support means including at least two parts relatively rotatable with relation to each other about a common axis, one of said parts being operatively connected to said sickle bar at a point substantially centrally of the sickle bar, driving means operatively connected with said sickle and supported at least partially by said support means, a universal connection in said driving means in substantial alignment with the axis of said pivotal connection, said driving means being adapted for connection with a source of power.

15. A push-type of mower comprising support means, said support means having a pivotal connection adapted for mounting on a motor vehicle, a sickle and a sickle bar, said support means including at least two parts relatively rotatable with relation to each other about a common axis, one of said parts being operatively connected to said sickle bar at a point substantially centrally of the sickle bar, driving means operatively connected with said sickle and supported at least partially by said support means, a universal connection in said driving means in substantial alignment with the axis of said pivotal connection, said driving means being adapted for connection with a source of power and including a crank mechanism connected to said sickle.

16. A push-type mower comprising support means, said support means having a pivotal connection adapted for mounting on a motor vehicle, a sickle and a sickle bar, said support means including at least two parts relatively rotatable with relation to each other about a common axis, one of said parts being operatively connected to said sickle bar at a point substantially centrally of the sickle bar, driving means operatively connected with said sickle and supported at least partially by said support means, a universal connection in said driving means in substantial alignment with the axis of said pivotal connection, said driving means being adapted for connection with a source of power and including a crank mechanism connected to said sickle, a thrust link and a thrust block.

17. A push-type mower comprising support means, said support means having a pivotal connection adapted for mounting on a motor vehicle, a sickle and a sickle bar, said support means including at least two parts relatively rotatable with relation to each other about a common axis, one of said parts being operatively connected to said sickle bar at a point substantially centrally of the sickle bar, driving means operatively connected with said sickle and supported at least partially by said support means, a universal connection for said driving means in substantial alignment with the axis of said pivotal connection, said driving means being adapted in connection with a source of power, said relatively rotatable parts including a part rigidly connected to the sickle bar and a second part mounted in sleeved relationship with said first-named part.

PETER TURNER.

REFERENCES CITED

The following references are of record in the file of this patent:

UNITED STATES PATENTS

| Number | Name | Date |
| --- | --- | --- |
| 1,092,722 | Kluge | Apr. 7, 1914 |
| 1,105,751 | Bruce | Aug. 4, 1914 |
| 1,834,523 | Koelling | Dec. 1, 1931 |